US007689755B2

(12) United States Patent
Balasubramanian et al.

(10) Patent No.: US 7,689,755 B2
(45) Date of Patent: Mar. 30, 2010

(54) APPARATUS AND METHOD FOR SHARING DEVICES BETWEEN MULTIPLE EXECUTION DOMAINS OF A HARDWARE PLATFORM

(75) Inventors: Ramasubramanian Balasubramanian, Tamil Nadu (IN); Kiran S. Panesar, Kamataka (IN)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 11/715,611

(22) Filed: Mar. 7, 2007

(65) Prior Publication Data

US 2008/0222338 A1 Sep. 11, 2008

(51) Int. Cl.
*G06F 13/36* (2006.01)
(52) U.S. Cl. .......................................... 710/311; 707/10
(58) Field of Classification Search ................. 710/306, 710/311, 3, 8–11; 711/6; 707/10; 709/229
See application file for complete search history.

(56) References Cited

U.S. PATENT DOCUMENTS 6,009,488 A 12/1999 Kavipurapu 6,640,278 B1 * 10/2003 Nolan et al. .................. 711/6
2003/0110269 A1 * 6/2003 Chen ............................ 709/228

* cited by examiner

*Primary Examiner*—Clifford H Knoll
(74) *Attorney, Agent, or Firm*—Blakely, Sokoloff, Taylor & Zafman LLP

(57) ABSTRACT

A method and apparatus for sharing peripheral devices between multiple execution domains of a hardware platform are described. In one embodiment, the method includes the configuration end-point devices, bridges and interconnects of a hardware platform including at least two execution domains. When a configuration requests is issued from an execution domain, the configuration requests may be intercepted. Hence, the received configuration request is not used to configure the peripheral end-points, bridges or interconnects of the hardware platform. Configuration information decoded from intercepted configuration request may be stored as virtual configuration information. In one embodiment, configuration information is read from a target of the configuration request to identify actual configuration information. This actual configuration information may be stored within a translation table and mapped to the virtual configuration information to enable translation of domain specific addresses to real (actual) addresses. Other embodiments are described and claimed.

20 Claims, 12 Drawing Sheets

| Partition 0 VNumber Table 592-1 | |
|---|---|
| V# | Actual# |
| V# | Actual# |
| V# | Actual# |
| V# | Actual# |
| ... more entries ... | |

| Partition 1 VNumber Table 592-2 | |
|---|---|
| V# | Actual# |
| V# | Actual# |
| V# | Actual# |
| V# | Actual# |
| ... more entries ... | |

| Partition 0 VMMIO Table 594-1 | |
|---|---|
| MMIO Base/Limit | VMMIO Base/Limit |
| MMIO Base/Limit | VMMIO Base/Limit |
| ... more entries ... | |

| Partition 1 VMMIO Table 594-2 | |
|---|---|
| MMIO Base/Limit | VMMIO Base/Limit |
| MMIO Base/Limit | VMMIO Base/Limit |
| ... more entries ... | |

Partition 0 Bus/Device bitmask 596-1

| B | D | D | D | D | B | D | D |
|---|---|---|---|---|---|---|---|
| D | B | B | B | D | D | B | D |

... more entries ...

Partition 1 Bus/Device bitmask 596-2

| B | D | D | D | D | B | D | D |
|---|---|---|---|---|---|---|---|
| D | B | B | B | D | D | B | D |

... more entries ...

APPARATUS AND METHOD FOR SHARING DEVICES BETWEEN MULTIPLE EXECUTION DOMAINS OF A HARDWARE PLATFORM

RELATED APPLICATIONS

The present application is related to co-pending U.S. patent application Ser. No. 11/618,450, entitled "Chipset Support for Partitioning PCI Express Configuration Space Among Multiple Partitions," and filed on Dec. 28, 2006.

FIELD OF THE INVENTION

One or more embodiments of the invention relate generally to the field of integrated circuit and computer system design. More particularly, one or more of the embodiments of the invention relates to a method and apparatus for sharing peripheral devices between multiple execution domains of a hardware platform.

BACKGROUND OF THE INVENTION

Partitioning of hardware platform enables the use of multiple execution domains within a single hardware platform. Various types of partitioning exist including, for example, firm partitioning as well as hard partitioning. In firm partitioning, portions of an input/output (I/O) subsystem may be shared among execution domains. One type of firm partitioning is referred to as embedded partitioning. Embedded partitioning is a scheme of partitioning a multi core system, which allows an embedded partition to provide various value added capabilities to the operating system(s) running on non-embedded partitions, referred to herein as legacy partitions.

Embedded partitioning differs from server partitioning since server partitioning dedicates hardware resources to partitions. Conversely, embedded partitioning requires that parts of the platform are shared among partitions. For example, embedded partitions may run on different processor cores and access different portions of dynamic random access memory (DRAM), but may share portions of the I/O subsystem. One difference between embedded partitioning and firm partitioning is that embedded partitioning may run modified operating systems (OS) that are partitioning aware, whereas firm partitioning is limited to running a legacy OS.

A virtual machine architecture logically partitions a physical machine, such that the underlying hardware of the machine is time-shared and appears as one or more independently operating virtual machines (VMs.) A virtual machine monitor (VMM) creates the VM and runs on a computer to facilitate, for other software, the abstraction of one or more VMs. Each VM may function as a self-contained platform, running its own operating system (OS) and application software. The software running in a VM is collectively referred to herein as guest software.

The guest software expects to run as if it were running on a dedicated computer rather than a VM. That is, the guest software expects to control various events and have access to hardware resources on a computer (e.g., physical machine.) The hardware resources of a physical machine may include one or more processors, resources resident on the processor (e.g. control registers cashes and others), memory (instructions residing in memory, e.g. descriptive tables,) and other resources (e.g. peripheral (I/O) devices) that reside in the physical machine.

As described herein execution domains may refer to the various partitions of a hardware platform, as well as the various virtual machines of hardware platform or other like execution domain. The various execution domains running on the single hardware platform may each run a separate OS that attempts to enumerate a device tree and configure the bridges, interconnects and end-point devices that are discovered during an interconnect scan. If each execution domain independently configures the device tree and is without knowledge of other execution domains, conflicting configurations are possible. Hence, the sharing of configuration and enumeration of peripheral end-point devices between multiple execution domains may result in conflicting configurations. Conflicting configurations can render some or all peripheral end-point devices/functions inaccessible, or cause such devices/functions to operate in an unintended matter.

BRIEF DESCRIPTION OF THE DRAWINGS

The various embodiments of the present invention are illustrated by way of example, and not by way of limitation, in the figures of the accompanying drawings and in which:

FIG. 8 is a block diagram further illustrating various translation tables to enable the sharing of peripheral end-point devices between multiple execution domains according to one embodiment.

DETAILED DESCRIPTION

A method and apparatus for sharing peripheral devices between multiple execution domains of a hardware platform are described. In one embodiment, the method includes the configuration of at least one of an end-point device, a bridge and an interconnect of a hardware platform including at least two execution domains. When a configuration request is issued from an execution domain, the configuration requests may be intercepted. As a result, the configuration request from the execution domain is not used to configure the peripheral end-points, bridges or interconnects of the hardware platform. Configuration information decoded from the intercepted configuration request may be stored as virtual configuration information. In one embodiment configuration information is read from a target of the configuration request to identify actual configuration information of the target. This actual configuration information may be stored within a translation table and mapped to the virtual configuration information to enable translation of domain specific addresses to real (actual) addresses.

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

Figure 1:
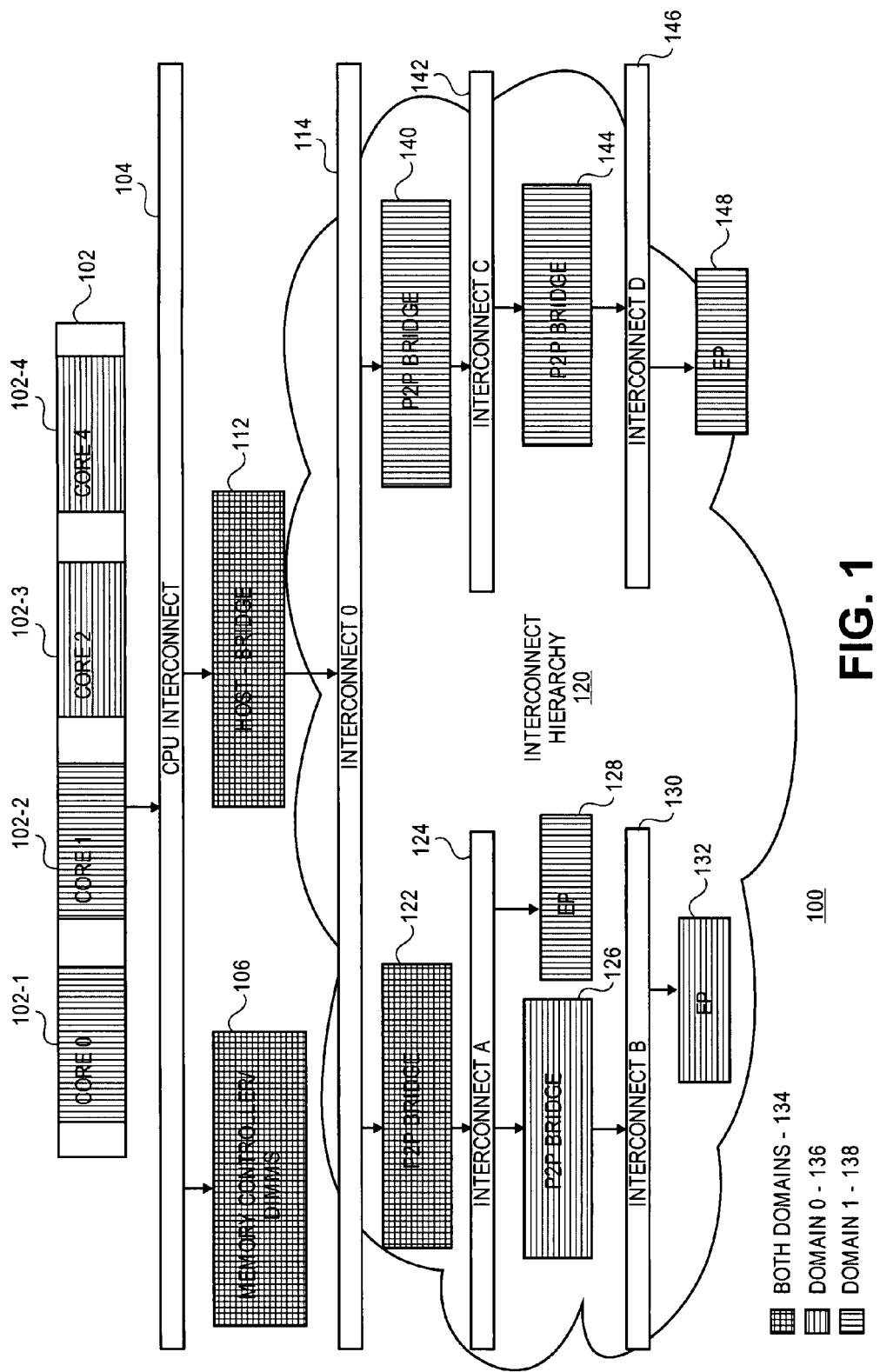
FIG. 1 is block diagram illustrating a computer system for sharing devices between multiple execution domains of the hardware platform according to one embodiment.

FIG. 1 is a block diagram illustrating a computer system 100 in which devices are shared among multiple execution domains according to one embodiment. Representatively, FIG. 1 illustrates computer system 100 according to a hierarchy of computer system interconnects, bridges and devices. As shown in FIG. 1 a multi-core processor 102 includes core 102-1, core 102-2, core 102-3 and core 102-4. In the embodiment illustrated, domain 136 runs on processor cores 102-1 and 102-2 whereas domain 138 runs on cores 102-3 and 102-4. As indicated above, the execution domains described herein, including domains 136 and 138, may refer to various hardware partitions of computer system 100 as well as various virtual machines (VM) of computer system 100 or other like execution domains.

Representatively, FIG. 1 illustrates that processor 102, bridge 112 and memory controller/dual inline memory modules (DIMMs) are coupled to CPU interconnect 104. As further illustrated in FIG. 1, host bridge 112 interconnects interconnect hierarchy (I/O) subsystem 120 to CPU interconnect 104 via interconnect 114. As described herein, interconnect hierarchy 120 may be referred to as an input/output (I/O) subsystem. Representatively, I/O subsystem 120 includes pci-to-pci (P2P) bridge 122 and P2P bridge 140 for interconnect 112. Likewise, P2P bridge 126 and P2P bridge 144 are separately coupled to interconnects 124 and 142. Similarly, end-point (EP) devices 131 and 148 are coupled to interconnects 130 and 146.

An initial system software, which runs before the execution domains 136 and 138 are started, configures the various bridges and devices. This system software could be a system firmware (e.g., a basic input output system BIOS), virtual machine monitor, or any other system software that has full access to the computer system. In one embodiment, the chipset comprising of P2P bridges, includes a lock bit that allows this configuration. Later when the chipset is locked, the domains cannot access the configuration registers directly.

As shown in FIG. 1, execution domains 136 and 138 share memory controller 106, host bridge 112 and P2P bridge 122. Conversely, domain 136 executes on processor cores 102-1 and 102-2 and is assigned exclusive access to P2P bridge 140, P2P bridge 144, interconnect 142, interconnect 146 and EP device 148. Conversely, execution domain 138 runs on processor cores 102-3 and 102-4 and has exclusive access to P2P bridge 126, interconnect 124, interconnect 130 and EP device 132.

In one embodiment, execution domains 136 and 138, as shown in FIG. 1, may include platform enumeration software as well as platform configuration software as part of the separate operating system (OS) of execution domains 136 and 138. As a result of sharing of I/O subsystem 120 between execution domains 136 and 138 the separate OSes of execution domains 136 and 138 may attempt to enumerate I/O subsystem 120 as well as configure the bridges, interconnects and end-points that are discovered during an interconnect scan. As described herein, enumeration refers to the process of discovering the various interconnects of an I/O subsystem as well as the devices and functions that reside on such interconnects. Configuration of such interconnects, functions and devices is required for successful operation of the I/O subsystem.

In one embodiment, devices may reside on an interconnect and contain one or more functions. A device containing multiple functions may be referred to as a multi-function device, such that each function within a multi-function device provides a standard one functionality. Devices may contain up to a maximum of eight functions numbered 0-7. In addition, at least one function (function 0) is required to be implemented within an end-point device, whereas the first function in a multi-function device is required to be function 0 although remaining functions do not have to be implemented in a sequential manner.

Accordingly, as part of the scanning of the various bridges, interconnects and devices of an I/O subsystem, which may be referred to as the fabric, the processes of scanning such fabric to discover which topologies is referred to as the enumeration process, this enumeration process is based on the limited existence of the host/bridge 112 within the root complex and the interconnect (interconnect 0) 114 that is directly connected to the downstream (secondary) side of the bridge.

Unfortunately, if execution domain 136 and 138 independently configure I/O subsystem 120, without knowledge of the other execution domains, conflicting configurations are possible. Hence, the sharing of configuration and enumeration of peripheral end-point devices between multiple execution domains results in conflicting configurations that can render some or all peripheral end-point devices/functions inaccessible or cause devices/functions to operate in an unintended manner.

TABLE 1

| Physical Bus | Domain 0 configuration | Domain 1 configuration |
| --- | --- | --- |
| A | 1 | Not Visible |
| B | 2 | Not Visible |
| C | Not Visible | 1 |
| D | Not Visible | 2 |

Table 1 illustrates an enumeration of physical interconnects A-D (124, 130, 142 and 146.) In one embodiment an initial configuration or enumeration of I/O subsystem 120 may result in the assignment of physical interconnect members to interconnects A-D (124, 130, 142 and 146.) as shown in Table 1. However, as shown in FIG. 1, interconnect hierarchy 120 is partitioned, such that some of the bridges, devices, and interconnects are not shared, but exclusively owned between the respective domains.

In one embodiment the interconnect hierarchy 120 as shown in FIG. 1 may operate according to a P2P interconnect/link protocol including but not limited to common system interface (CSI) peripheral component interconnect (PCI) express (PCIe) or other like P2P interconnect. Accordingly, although one or more of the embodiments described herein may be provided with reference to PCIe, those skilled in the art should recognize that the embodiments described herein are not limited to PCI or PCIe and are therefore applicable to other like interconnect protocols.

In one embodiment interconnects 114, 124, 142, 130, and 146 may provide a P2P interconnect, such as defined by PCIe base specification, revision 1.1 to allow bidirectional communication between end-point devices 132 and 148 and host bridge 110. In one embodiment, allowing domains 136 and 138 to configure the devices of I/O subsystem (interconnect hierarchy) 120 that shared between the execution domains results in a conflicting configuration. In other words, the separate configuration of the bridges and EP devices base address registers (BAR) can cause some or all devices/functions to be inaccessible or to work in an unintended matter. The conflict may arise due to separate configuration of the following configuration elements: (1) interconnect numbers, programmed by system software and bridges; (2) bridge downstream memory ranges indicating which address range needs to be forwarded downstream; and (3) device base address registries (BAR) indicating the memory mapped I/O regions to which a device responds.

Table 1 illustrates the configuration, specifically the enumeration, of interconnects A-D (124, 130, 142 and 146) by execution domains 136 and 138. For example, if each of the domains programs bridges 122 and 140 independently, interconnect numbers may be assigned as shown in Table 1. Representatively, interconnects 124 and 146 are assigned the same interconnect number. Likewise, interconnect 130 and interconnect 146 may be assigned the identical interconnect number. Hence, a conflict arises due to the assignment of matching interconnect numbers to different interconnects.

TABLE 2

| Bridge | Memory Base/Limit Domain 0 | Memory Base/Limit Domain 1 |
| --- | --- | --- |
| Bridge 103 | 0x80000000-0x80001000 | UNDEF |
| Bridge 104 | UNDEF | 0x80000000-0x80001000 |

Regarding configuration of device BAR's, Table 2 illustrates the assignment of conflicting memory mapped I/O (MMIO) ranges to the various device BAR's. The device BAR's may be used to implement the memory range to a device that responds (e.g., the portion of memory mapped) to the device. For example, considering that the MMIO address range is some arbitrary 0x80000000-0x90000000. Also consider that the devices each use one MMIO range, each with a size of 0x1000. It is possible that domain 136 might attempt to configure EP Device 132 on interconnect 130 with MMIO range 0x80000000-0x80000100. Likewise, domain 138 might attempt to configure EP device 148 on interconnect 146, with the same address range. Accordingly, as shown in Table 2, execution domains 136 and 138 have conflicting MMIO ranges, which may cause the devices to operate in an unintended manner.

TABLE 3

| Device MMIO BAR register | Domain 136 configuration | Domain 138 configuration |
| --- | --- | --- |
| Device 2 BAR1 | 0x8000 000, size 0x1000 | Not Visible |
| Device 3 BAR1 | Not Visible | 0x8000 000, size 0x1000 |

Table 3 illustrates the configuration of bridge memory/base limit registers. As shown in Table 2, domain 136 and domain 138 configure interconnects 130 and 146 using matching MMIO address ranges. For the same reason domains 136 and 138 may configure memory base/limit registers of the bridges of I/O subsystem 120 using conflicting address ranges. Bridge 126 of domain 136, which includes downstream interconnect 130, may attempt to configure memory/base limit registers with address range 0x80000000, 0x1000. Similarly bridge 144 of domain 136, coupled to interconnect 146 downstream, might attempt to configure the memory Base/Limit register on bridge 144 with the same range. Accordingly as shown in Table 3, it is possible for two domains, with shared access to a bridge/device configuration address space, to incorrectly configure an I/O subsystem. As a result the various devices may be rendered unusable or even in worse cases cause various software and hardware failures.

Figure 2:
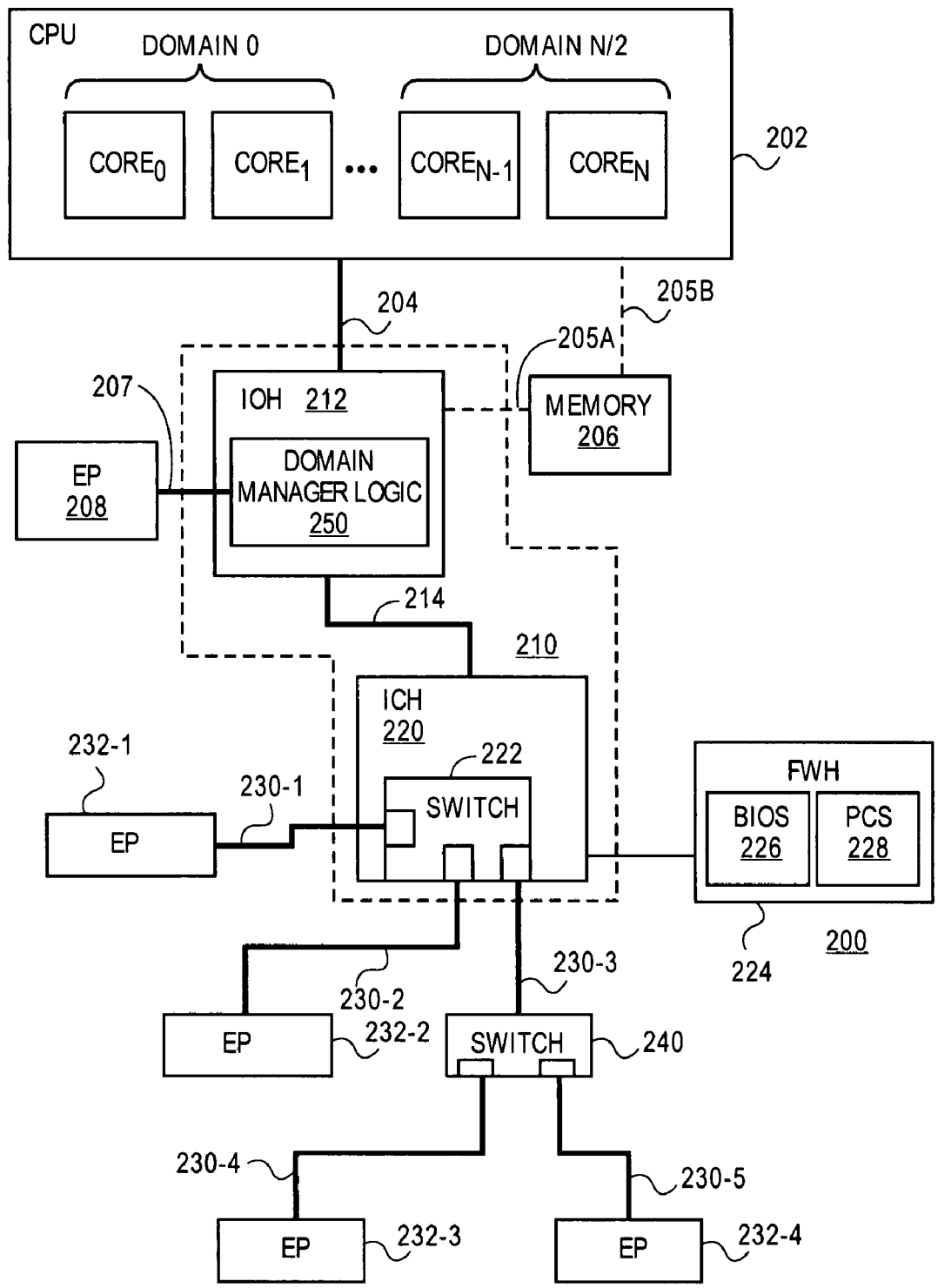
FIG. 2 is block diagram illustrating a computer system including domain manager logic to enable the sharing of devices between multiple execution domains according to one embodiment.

FIG. 2 is a block diagram illustrating computer system 200 including domain manager logic (DML) 250 to enable the sharing of devices between multiple execution domains, in accordance with one embodiment. Representatively, computer system 100 comprises a processor system bus (front side bus (FSB)) 104 for communicating information between processor (CPU) 202 and chipset 210. As described herein, the term "chipset" is used in a manner to collectively describe the various devices coupled to CPU 102 to perform desired system functionality. In the embodiment illustrated, CPU 102 is a multicore chip multiprocessor (CMP) including cores 202-1, 202-2, 202-3 and 202-4.

In one embodiment, chipset 110 comprises input/output (I/O) hub (IOH) 212 coupled to end-point (EP) 208, such as a graphics controller, via interconnect 207. In one embodiment, graphics controller is integrated into IOH 212 in conjunction with a memory controller (not shown), such that, in one embodiment, IOH 212 operates as an integrated graphics IOH (GIOH). Representatively, IOH 212 is also coupled to main memory 206 via interconnect 205A and includes a memory controller (see FIG. 13.) In one embodiment, memory 206 is coupled to CPU 202 via interconnect 205B, such that CPU 202 includes a memory controller (see FIG. 12.) In one embodiment, main memory 206 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 210 includes an input/output (I/O) controller hub (ICH) 220 coupled to IOH 212 via interconnect 214. Representatively, ICH 120 may couple endpoint devices 232-2, 232-2 and 232-3, 232-4, via switch 240, to chipset 210 via interconnects 230-1, 230-2, 230-4 and 230-5. Representatively, switch 240 is coupled with EP devices 230-3 and 230-4 via interconnects 230-4 and 230-5. In one embodiment, the functionality of IOH 210 and ICH 220 are integrated within chipset 210. In one embodiment, chipset 210 may be incorporated into CPU 102 to provide a system on chip (see FIGS. 12 and 13.)

Representatively, computer system 200 further includes non-volatile (e.g., Flash) memory 228. In one embodiment, flash memory 224 may be referred to as a "firmware hub" or FWH, which may include a basic input/output system (BIOS) 226 to perform initialization of computer system 100. In one embodiment, platform configuration software 228 performs initialization of DML 250 to enable device sharing, according to one embodiment.

Figure 3:
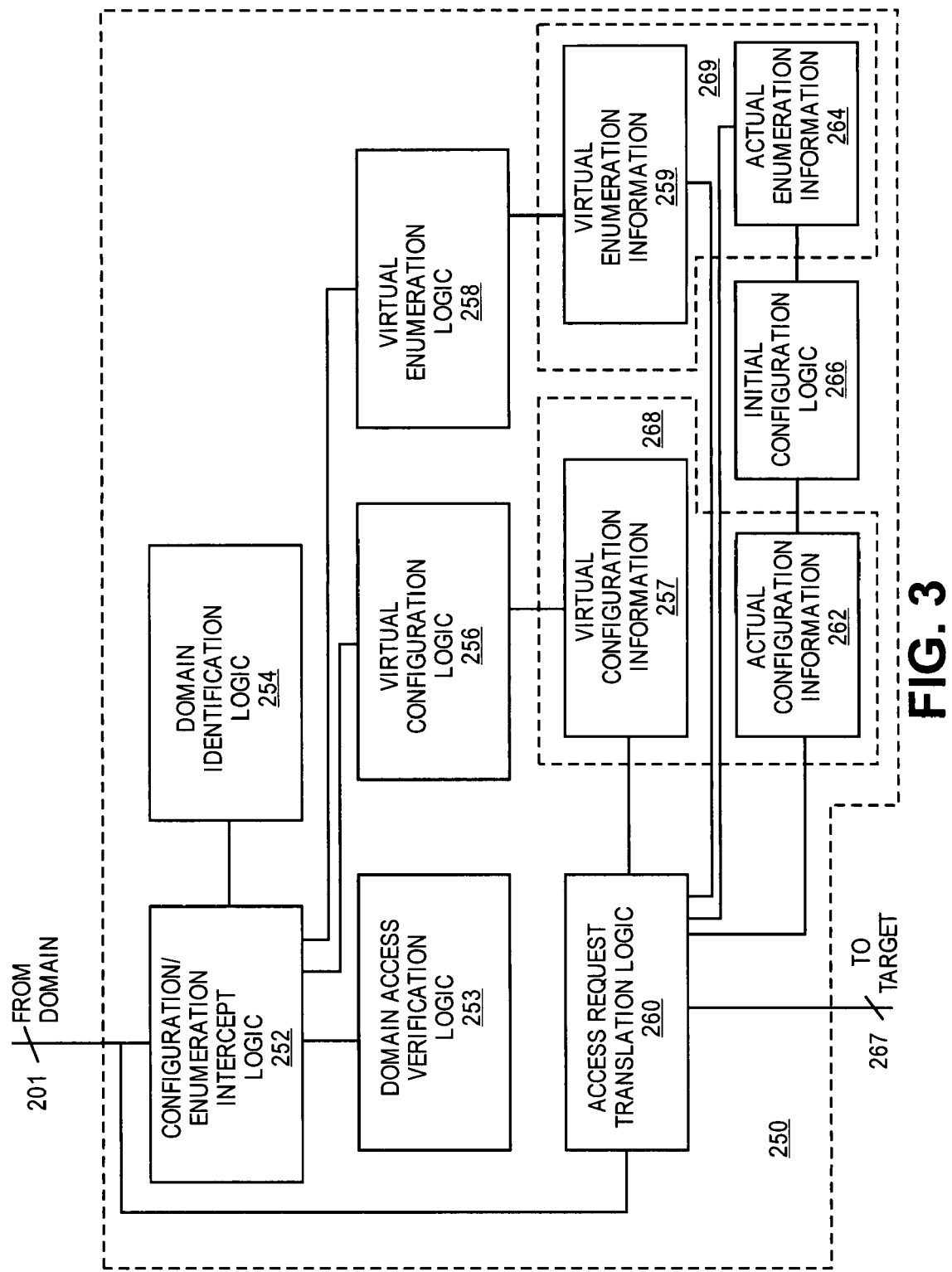
FIG. 3 is a block diagram further illustrating the domain manager logic (DML) of FIG. 2 according to one embodiment.

Similar to the system configuration as shown in FIG. 1, the computer system in FIG. 2 is shared between multiple execution domains. In one embodiment DML 250 enables the sharing of computer system 200 between multiple execution domains according to one embodiment. FIG. 3 further illustrates DML 200 according to one embodiment.

In one embodiment DML 250 avoids conflicting configuration of an interconnect hierarchy shared between multiple execution domains by using virtual interconnect numbers and virtual memory mapped I/O (MMIO) ranges. In one embodiment a chipset or IOH, such for example IOH 212 as shown in FIG. 2, maintains translation tables that translate from virtual configurations to real configurations. In one embodiment, the translation tables are automatically populated by the chipset 210 and DML 250 by identifying device accesses from system configuration software in each of the execution domains. Hence, during run time, configuration or memory accesses are translated from domain specific addresses to real addresses. In one embodiment, the virtual configuration is captured in raw format in memory and the information is used at run time to translate from virtual configuration to real configuration. In another embodiment, the tables are maintained by the domain manager, instead of at the hardware.

Referring again to FIG. 3, DML 250 may include configuration/enumeration intercept logic 252. In one embodiment, interception of a configuration/enumeration request 201 issued from an execution domain is enabled due to partitioning of a memory mapped configuration address space range. In one embodiment, the address space is provided for configuration of an interconnect protocol according to which a system operates. For example, PCIe provides an interconnect protocol configuration space as a memory mapped configuration (MMCFG) address space range.

The PCIe configuration space may include a 256 megabyte (MB) relocatable memory mapped range used to access the PCIe configuration address space. For example, each possible PCIe device has a four kilobyte (KB) area within the MMCFG space for each possible function. Hence, processor accesses to the MMCFG address range may be performed using regular memory read and memory write operations.

In one embodiment, a basic input/output system (BIOS) ensures that the MMCFG address range does not overlap with any other address ranges and may use various tables such as, for example, an advanced configuration and power interface (ACPI) table to communicate the location of an MMCFG based address to the operating system. Typically this area is mapped to a legal location between the top of low memory (TOLM) and four gigabytes (GB); more specifically, between TOLM and the lowest usable memory mapped I/O (MMIO) range. Alternatively, the MMCFG address range can be set above four GB, above the top of memory, and not overlapping with the high MMIO space.

Figure 4:
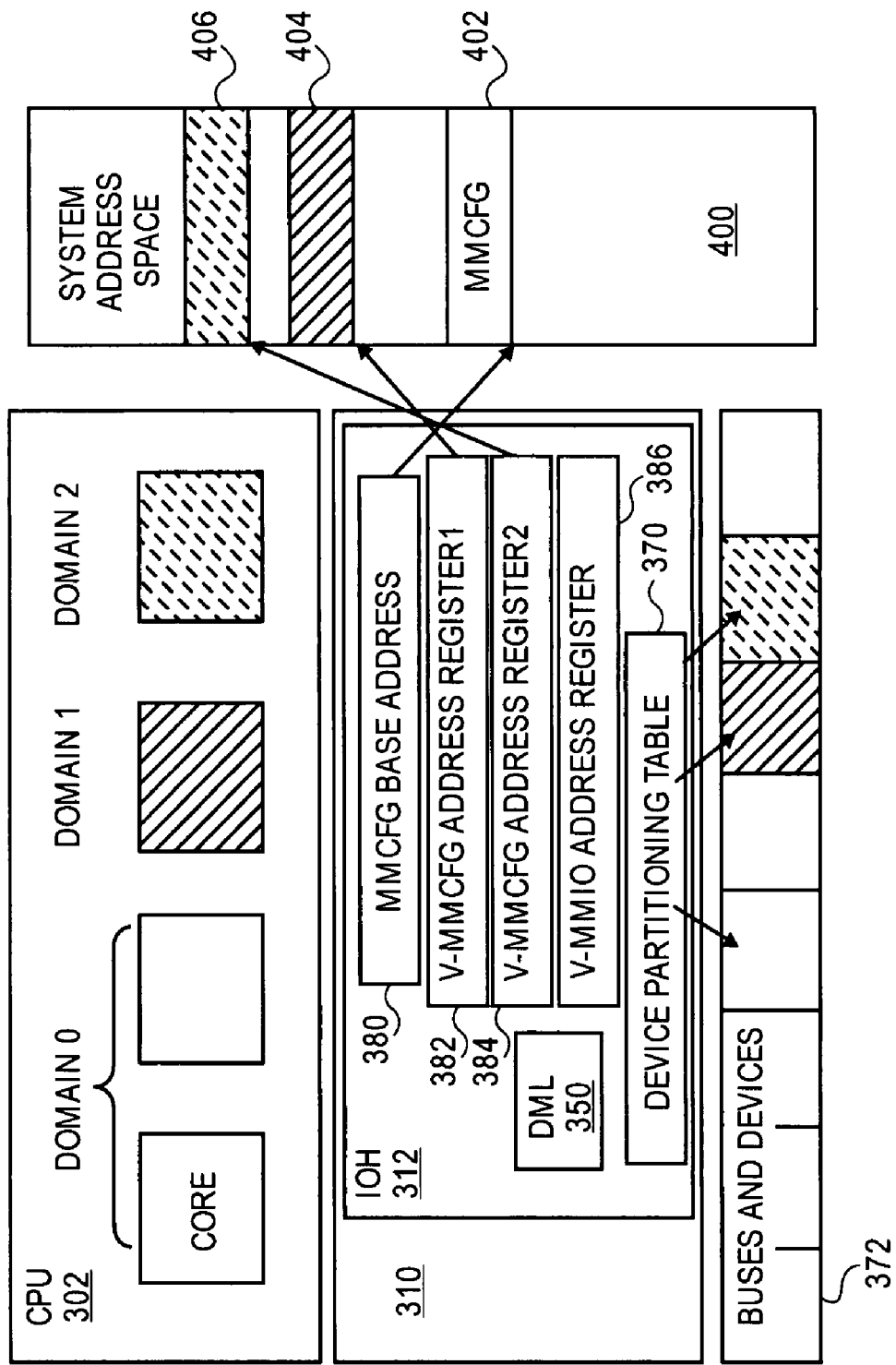
FIG. 4 is a block diagram further illustrating the computer system of FIG. 2 to depict configuration address space sharing among multiple execution domains according to one embodiment.

Referring again to FIG. 3, in one embodiment DML 250 may initially partition the MMCFG address space between each of the multiple execution domains. In one embodiment, for example as shown in FIG. 4, an address range (404, 406) within system address space 400 is assigned as an MMCFG address range to each respective execution domain; such address ranges are stored by the chipset as virtual MMCFG (MMCFG) address ranges. Each assigned MMCFG address range is unique for each execution domain.

Referring again to FIG. 3, in one embodiment configurations/enumerations intercept logic 252 detects a write request that falls within MMCFG address range. As a result, the detected configuration request is intercepted by intercept logic 252. In addition, such configuration request may be directed to programming the base address registers (BARs) of a device to indicate the memory range to which the device responds. In other words, access to the device is made by access the memory range mapped to the device.

In one embodiment, the concept of virtual MMIO (MMIO) ranges is provided to avoid conflicting MMIO address ranges. In one embodiment, a unique MMIO range is assigned to each respective execution domain by initial configuration logic 266. Device drivers in the domains use MMIO addresses to program devices. In response to such programming of devices, access request translation logic 260 may translate the MMIO ranges to physical MMIO ranges when a transaction is received from a domain. In one embodiment, a per domain translation table from MMIO to MMIO address range is maintained by the DML 250. In one embodiment, the BIOS or DML 250 indicates the MMIO range to each domain.

Referring again to FIG. 3, an intercepted configuration/enumeration request 201 is passed to domain identification logic 254 which identifies a source of the configuration request (source domain) according to the address range within which an address configuration request falls. In one embodiment, the domain ID is part of the interconnect transaction. Accordingly, in one embodiment the assignment of MMIO ranges and MMCFG ranges to the various execution domains enables the identification logic 254 to determine a domain number from received configuration request.

In one embodiment a chipset maintains registers to store the base and limit values of the MMIO and MMCFG address ranges for each domain, for example as shown in FIG. 4. These values are populated by initial configuration logic 266 of, for example, DML 250. Accordingly, when access is made to a MMCFG range or a MMIO range, the domain number can be obtained by referring to which base and limit range the access falls. In the embodiments described, the execution domains that include but are not limited to hardware partitions, virtual machines or other like execution domains.

In one embodiment, functionality of DML 250 may be provided by a virtual machine monitor or VMM. In an alternate embodiment, DML functionality is provided by an embedded partition.

Referring again to FIG. 3, once the domain number is identified by domain identification logic 254, domain verification logic 253 may determine whether the domain is authorized to configure the target device, bridge or interconnect. When such access is verified, virtual configuration logic 256, as well as virtual enumeration logic 258, may populate translation tables 257 and 259 to enable the translation of addresses from domain specific addresses to real physical addresses based on the system configuration. In one embodiment, virtual configuration logic 256 may store configuration information such as, for example, the MMIO ranges assigned by initial configuration logic to an execution domain as virtual configuration information 257. Likewise, virtual enumeration logic 258 may take information from enumeration requests and store such information as virtual enumeration information 259.

In one embodiment, configuration table 268 maps virtual configuration information 257 to actual configuration information 262. Similarly, table 269 maps virtual enumeration information 259 to actual enumeration information 264. Hence, configuration translation table 268 and the enumeration translation table 269 may be used by access request translation logic 260 to receive access request from the various execution domains and translate such access requests. In one embodiment, the actual configuration information 262 and actual enumeration information 264 are used to generate a modified access request 267 to prohibit conflicting configurations when an I/O subsystem is shared between multiple execution domains.

FIG. 4 is a block diagram further illustrating the computer system of FIG. 2 according to one embodiment. Representatively, computer system 300 includes a multi-core CPU 302 and chipset 310 having input/output hub (IOH) 312. As shown in FIG. 4, IOH 312 includes a MMCFG address register for each execution domain (e.g., 382 and 384). Likewise, IOH can include a MMCFG based address register 380 which identifies a start of the MMCFG address range within system address space 400. Likewise, the MMCFG address registers 382 and 384 may identify a base address of the virtual configuration address space assigned to the respective execution domain.

As further illustrated in FIG. 4 IOH 312 includes device partitioning table 370 to indicate the various interconnects and devices that are accessible to the various execution domains of computer system 300. As indicated above, an OS is required to use a BIOS provided MMIO address range. The BIOS may communicate the memory map information to the OS using map tables device by an ACPI. Portions of the system memory map which are not pre-assigned can potentially be used by the OS for MMIO.

In one embodiment, addition of a VMMIO descriptor table 386 is provided to describe the base and limit of the VMMIO address range to be used for devices. In should be noted that other mechanisms for obtaining a domain number avoid the need for requiring MMIO address ranges. According to such an embodiment, a single MMIO address range may be provided. In one embodiment, partitioning range registers (PXRR) provided by the cores in CPU 302 ensure that each domain is limited to assigned MMIO and MMCFG ranges. In one embodiment, access to the actual MMIO ranges is limited to the DML 250.

Figure 5:
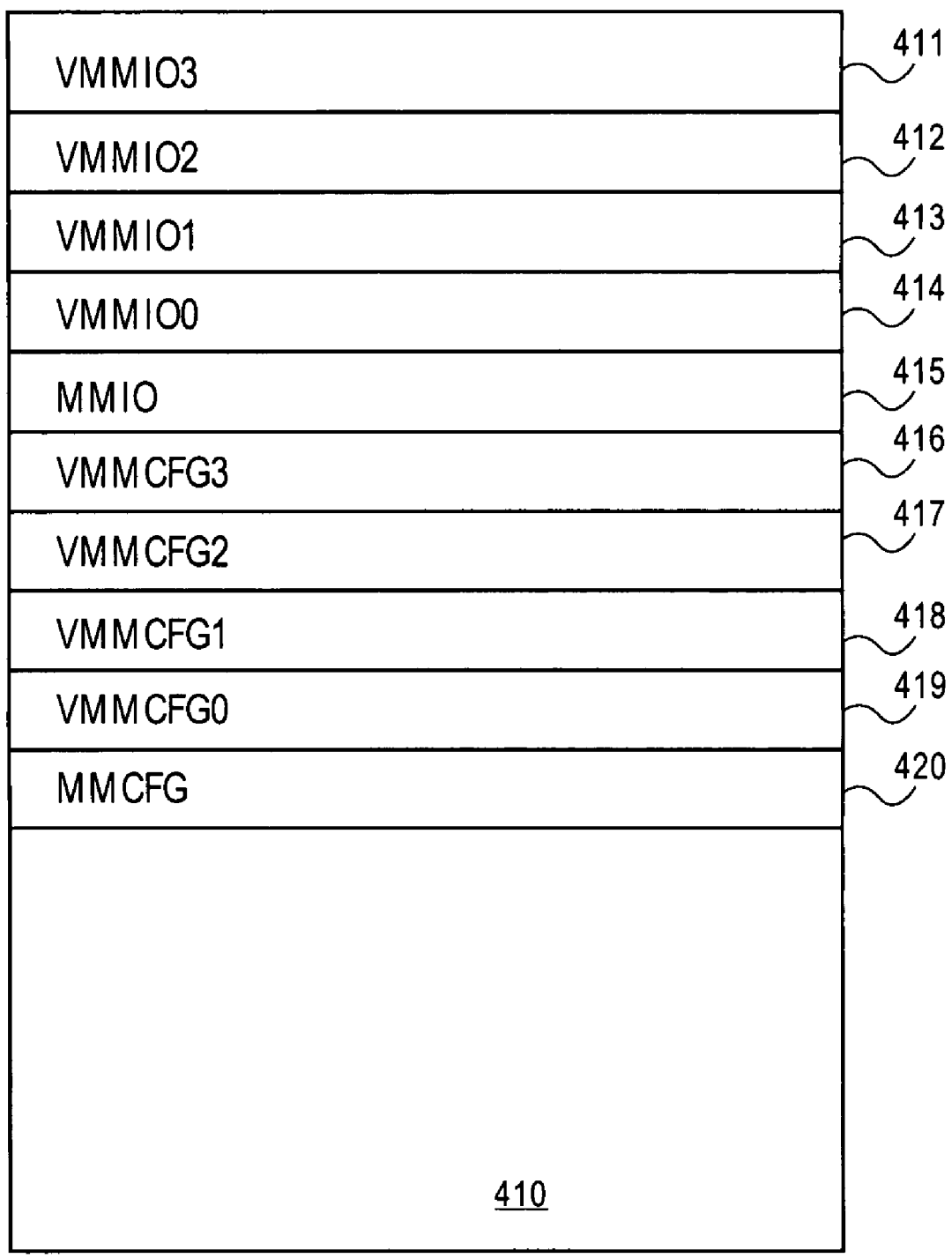
FIG. 5 is an address map illustrating virtual memory mapped configuration address spaces and virtual memory mapped input/output (I/O) address spaces according to one embodiment.

FIG. 5 is a block diagram illustrating a VMMCFG and VMMIO address map 410 according to one embodiment. Using address map 410, as shown in FIG. 5, a processes can obtain the domain number of the originator of the transaction (source domain). In one embodiment separate MMIO/MMCFG (415/420) address ranges simplify the task of obtaining a domain number from a transaction request irrespective of whether partitioning is at a socket level or at a subsocket level. As shown, MMCFG ranges 414-415 are mapped to MMIO range 415. Likewise, MMCFG ranges 416-419 map to MMCFG range 420.

Figure 6:
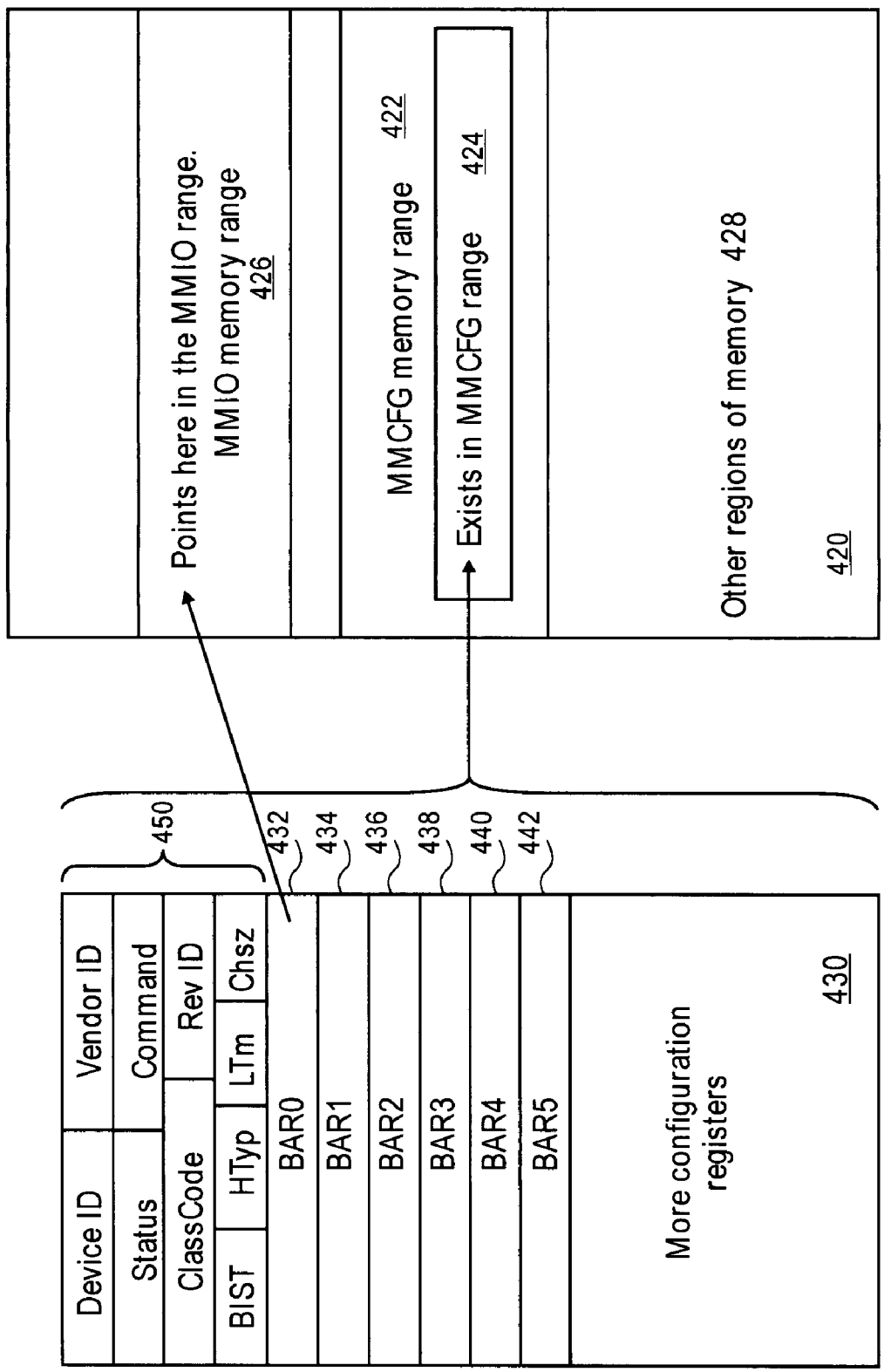
FIG. 6 is a block diagram illustrating a system memory map and configuration registers which are mapped within a memory mapped configuration address space range according to one embodiment.

FIG. 6 is a block diagram illustrating system memory map 420 as well as configuration registers 430, according to one embodiment. In one embodiment FIG. 6 illustrates a typical configuration space of a non-bridge device. Representatively, FIG. 6 illustrates that BAR registers 432-442 are pointers pointed to address spaces within the MMIO address range 426. As shown in FIG. 6, the configuration registers 430 of each device/function are memory mapped in MMCFG memory address range 422 and contained within memory range 424. In one embodiment, the BAR registers 432-442 have pointers whose values should be in MMIO address range 426.

Figure 7:
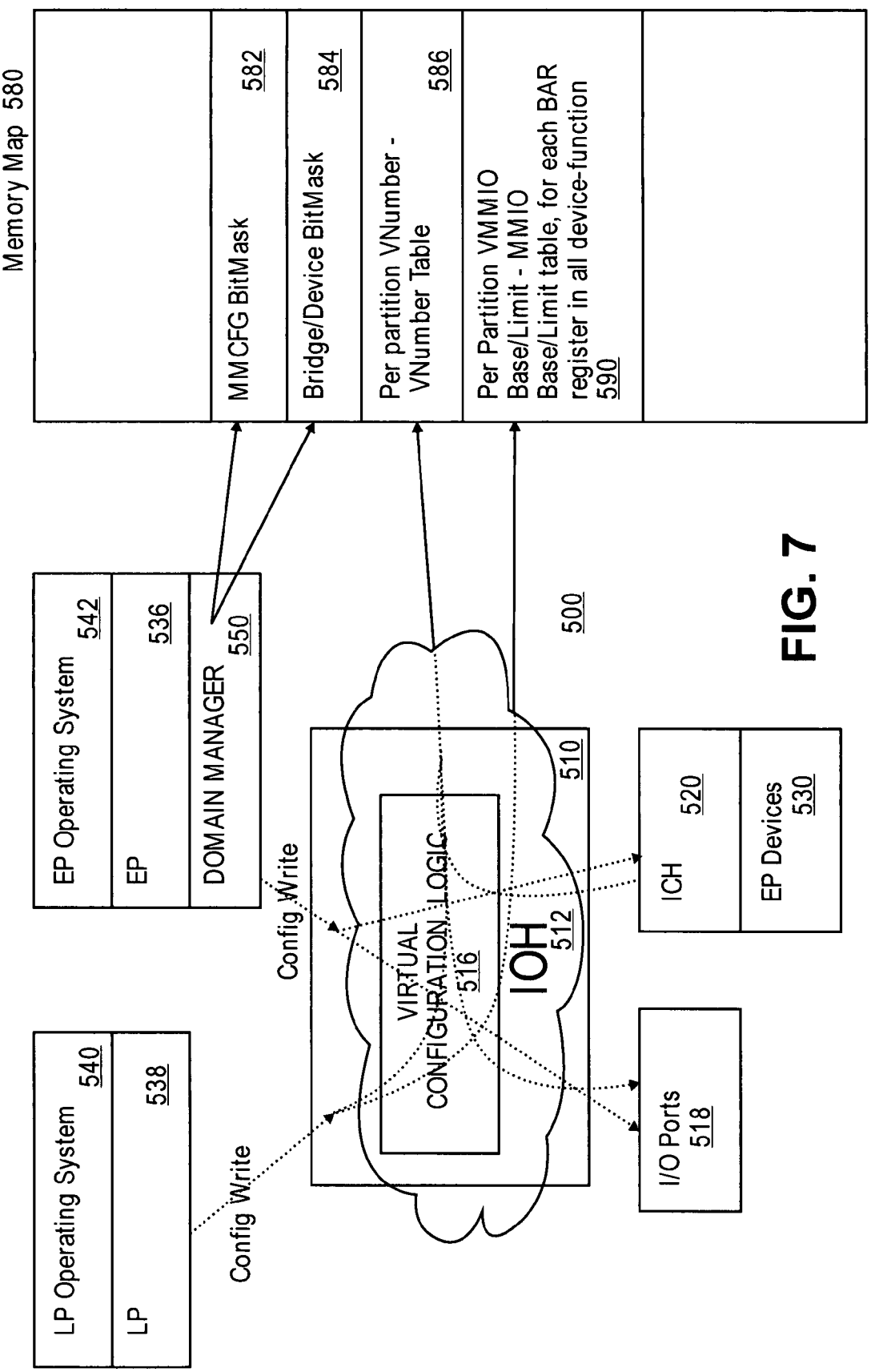
FIG. 7 is a block diagram illustrating the interception of enumeration and configuration write requests to avoid conflicting configurations of an I/O subsystem shared between multiple execution domains according to one embodiment.

FIG. 7 is a block diagram illustrating a computer system 500 including software domain manager logic 550 to enable the sharing of peripheral end-point devices among multiple execution domains, according to one embodiment. In the embodiment illustrated, DML 550 is implemented as software. In one embodiment DML 550 may be comprised of software residing within for example an embedded partition.

In one embodiment, DML software may be responsible for setting up the CPU and chipset partitioning hardware as well as allocating resources such as memory for I/O devices of the various execution domains. In one embodiment, DML software 550 may be distributed across multiple partitions or could be software that runs on a co-processor such as a manageability engine. In the embodiment illustrated computer system 500 is partitioned to include at least embedded partition (EP) 536 and legacy partition (LP) 538.

As shown in FIG. 7, LP partition 538 includes LP operation system (OS) 540, similarly, EP partition 536 includes OS 542. In the embodiment illustrated in FIG. 7, domain logic 550 of EP 536 is allowed to configure the interconnect configuration address space (MMCFG.) DML 550 running on EP partition 536 and IOH 512 may set up the necessary translation tables to remap virtual configuration information received from an execution domain such as LP partition 538 and EP partition 536. Since each execution domain operates according to, for example, virtual interconnect numbers and virtual MMIO ranges, IOH 512 of chipset 510 may include configuration logic 516 to translate virtual configurations to real configurations.

Referring again to FIG. 7, IOH 512 is coupled to interconnect ports 518, such as PCIe ports, IO controller hub (ICH) 520 as well as end-point device 530. As shown in FIG. 7, a configuration write may be received from LP partition 538. In one embodiment the configuration write is intercepted if an address associated with the configuration write falls within a virtual configuration address space range, such as a MMCFG address range.

In one embodiment, subsequent the interception of the configuration write, a domain ID of the configuration write allows IOH 512 to identify the domain from which a configuration write is received. In one embodiment, translation/configuration logic 516 of IOH 512 verifies that the source domain of the configuration write is authorized to perform configuration of a target device of the configuration write using MMCFG bitmask 582 of memory map 580. In other words, as described herein, a configuration write request is directed to a memory address which is mapped to a bridge, interconnect or end-point device of computer system 500.

As described herein, the device associated with an address within a MMCFG address range, to which the devices designated responds, is referred to as the target device of a configuration write request. In one embodiment, MMCFG bitmask 582, based on a domain ID of a source domain of a configuration write request, determines whether the source domain is authorized to configure the target device. Assuming a source domain is authorized to perform configuration, bridge/device bitmask 584 may be used to determine whether the target device is a bridge or non-bridge device.

In one embodiment, a configuration write to a bridge may seek to program a number of an interconnect coupled to the bridge. Conversely, if bitmask 584 identifies the target device as a non-bridge device, the configuration write request may target a device base address register (BAR). In one embodiment, the write request seeks to provide or assign a memory mapped I/O (MMIO) range to which a target device responds. In one embodiment, such information is stored as a virtual MMIO (MMIO) address range; such information is stored within a table for the corresponding BAR register according to the ID of the source domain.

In one embodiment, configuration/translation logic 516 determines the actual configuration information to enable mapping with the MMIO address range by reading a configuration of the target device BAR register to populate table 590. In one embodiment, previous configuration of such device BAR register is performed by DML 550. Hence, such information is available to configuration/translation logic 516. Similarly, an interconnect number, assigned by a source domain is stored as a virtual interconnect number (Vnumber) within interconnect number table 586. In addition the Vnumbers map to an actual interconnect number assigned by the domain manager logic 550 during device enumeration.

As shown in FIG. 7, all execution domains perform configuration reads and writes, however such configuration reads and writes do not reach the target device but are emulated by IOH 510. In one embodiment, the configuration writes are not written to the end-point devices; instead the necessary translation tables are populated by configuration/translation logic 516. During configuration reads, information from the translation tables 586 and 590 is referred and used to build a response for the read request. In addition, during memory access, translation logic 516 of IOH 512 may translate an interconnect number or bus/device/function (BDF) number associated with the an access request, as well as translation of the VMMIO address associated with the address request issued by an execution domain.

In the embodiments described, DML 550 performs configuration as well as enumeration of various end-point devices, interconnects and bridges of a computer system. For example, as prescribed by PCIe, enumeration of devices may seek to assign a bus number to each end-point device and interconnect of a computer system. Accordingly, the bus number enables the addressing of a target device. Likewise, configuration of, for example, computer system 500, shown in FIG. 7, may assign the MMIO ranges to device BAR registers as well as the assignment of address ranges to which a bridges' downstream devices fall under. In one embodiment, the configuration performed by the DML can be locked using a lock bit in the chipset, so the software in the domains do not over ride the configuration by the DML.

As described herein, an upstream component (UC) may refer to a component which is above or closer to a CPU such as for example CPU 202 shown in FIG. 2. Conversely, a downstream component (DC) may refer to a component which is below or away from the CPU. Accordingly, bridges are assigned address ranges for the devices or interconnects which are downstream from the bridge.

As shown in memory map 580 of FIG. 7, typical configuration writes to BAR/interconnect number registers of bridges and end-point devices originating on a virtual MMCFG range are not written to the target device. Instead such configuration write request may be intercepted and used to populate translations tables, bitmasks 582-586 and MMIO base limit table 590. In one embodiment, configuration of the computer system is limited to DML 550. According to one embodiment, functionality of DML 550 may be performed by a virtual machine monitor with virtual machines operating as the execution domains. In one embodiment, configuration attempts by any source domain other than DML 550 are written to translation tables 586 and 590.

In one embodiment, EP operating system 542 of EP partition 536 performs configuration of computer system 500. To enable translation, for each domain, a virtual Vnumber table 586 may be dynamically constructed by the IOH 512 for each LP partition 538 attempt to configure interconnect numbers of system bridges. In operation, whenever chipset 510 receives an ID address packet or configuration reads directed to a Vnumber, the Vnumber translation table 586 is accessed to identify the actual physical number. In addition, a request may be generated with the correct physical number. In PCI/PCIe the Vnumber table has the virtual and physical bus number mapping.

In one embodiment, LP partition 538 operates according to a Vnumber, which does not match an actual physical interconnect number. Accordingly, when such partition issues of configuration read or write requests to a VMMCFG address, the interconnect number within the VMMCFG address is incorrect. According to one embodiment, based on the Vnumber table 586, VMMCFG addresses of configuration read or write request are pre-translated. Based on the VMMCFG address, corrected MMCFG bitmask 582 identifies whether a source domain is authorized to configure or access device configuration information.

FIG. 8 is a block diagram illustrating translation table 590 including Vnumber tables 592-1 and 592-2 as well as VMMIO tables 594-1 and 594-2. In addition device bitmasks 596-1 and 596-2 are also provided. In the embodiment illustrated VMMIO tables 594 provide a mapping of VMMIO ranges to the physical MMIO ranges. Representatively, VMMIO table 594 include entries that map MMIO ranges to VMMIO ranges.

In one embodiment, generation or population of VMMIO tables 594 is performed when a configuration write request falls within a VMMCFG range and a device BAR register is sought to be written by the configuration write request. In response to such configuration write request, the actual configuration of the device BAR register of the target device is read. This data along with the data attempted to be written or recorded in VMMIO tables 594.

Accordingly when a MMIO request falls within a VMMIO range according to VMMIO tables 594, access to the memory range is made with a physical MMIO address range so that the access request may reach a target device. For example, according to the PCIe protocol, registers other than the BAR/interconnect number registers such as PCI express flow control, power management and the like may also be populated according to configuration write requests from one or more source domains.

Figure 9:
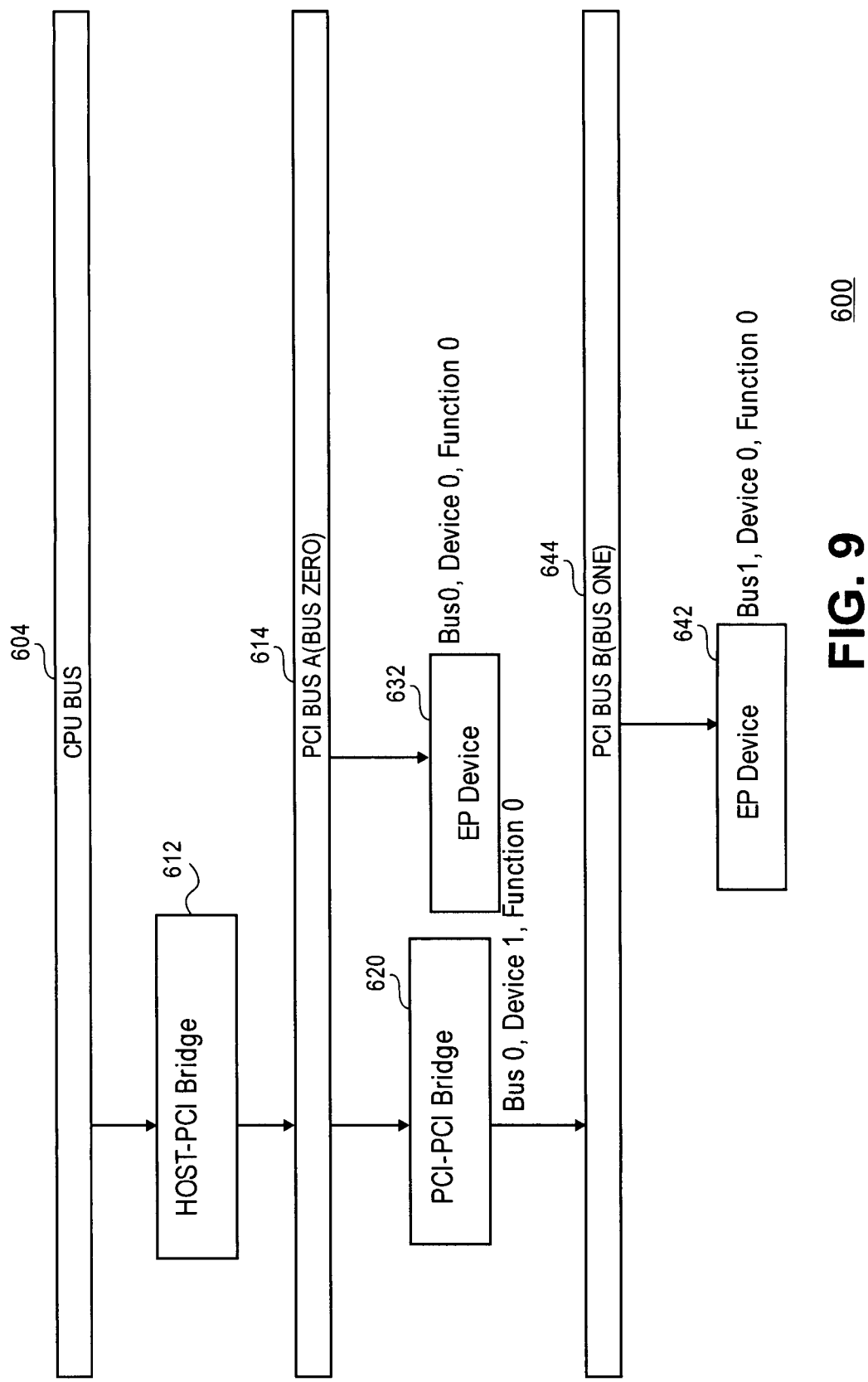
FIG. 9 is a block diagram illustrating a device/bridge/interconnect hierarchy according to one embodiment.

FIG. 9 is a block diagram 600 including an I/O subsystem hierarchy 600 according to one embodiment. Representatively, a CPU bus 604 is coupled to interconnect 614 according to host bridge 612, bridge 620 couples interconnect 614 with interconnect 614. EP device 632 is coupled to interconnect 614 and EP device 642 is coupled to interconnect 644.

TABLE 4

| Bridge/Device bitmask | |
|---|---|
| Bus0, Dev0, Func0 | Device |
| Bus0, Dev1, Func0 | Bridge |
| Bus1, Dev0, Func0 | Device |

Table 4 illustrates a bridge/device/bitmask which is populated by, for example, DML 550 as shown in FIG. 7. As shown in FIG. 9, DML configures the MMCFG memory map configuration space since interconnect 614 is enumerated with bus number 0 and interconnect 644 is enumerated with bus number 1. In addition, DML configures the MMIO ranges of the various devices. As shown in Table 4, DML sets a bridge/device bitmask in memory according to the bus/device/function numbers enumerated to the devices of I/O subsystem. Accordingly, when an execution domain boots following initialization of the execution domain, an OS of the execution domain may attempt to configure interconnect numbers as well as MMIO bar registers. When such configuration requests are detected, the IOH emulates the access request.

TABLE 5

VMMIO Translation table entry

| 0x80000000, 0x1FFF (Actual) | 0x90000000, 0x1FFF (VMMIO) |
|---|---|

Table 5 illustrates a VMMIO translation table entry, for example when some domain accesses a BAR register of a target device indicated by a bus device function number (BDF). In one embodiment, the BAR register configuration is written in the memory in the VMMIO translation table. For example, assuming the actual configuration of EP device 632 with BDF 000 as 0x80000000-0x80001FFF. Let Domain Zero attempt to configure the BAR register such that the address range that it expects be 0x90000000-0x90001FFF. The VMMIO table for domain zero in this case will have the following entry shown in Table 5.

Accordingly, Table 5 illustrates a VMMIO table entry for domain zero. During access to a VMMIO address range, the translation table is looked-up and the corresponding MMIO range is obtained to redirect access to the correct MMIO range. Similarly, assuming domain zero attempts to configure bridge 620 with downstream interconnect number 3, assuming domain one attempts to configure bridge 620 with interconnect number 2 the actual bus number configured by VMMIO may be number 1. As a result, the IOH may intercept a configuration write request issued from domain zero and domain one and uses such information to generate an entry in a Vnumber translation table.

TABLE 6

VNumber Table Entry(Domain 0)

| 3 | 1 |
|---|---|

TABLE 7

VBus Number Table Entry(Domain 1)

| 2 | 1 |
|---|---|

As shown in Tables 6 and 7, the actual bus number is written against the virtual bus number in the memory in the Vnumber translation table for future reference. Tables 6 and 7 illustrate the Vnumber tables for execution domains zero and one.

During access to VMMCFG address ranges, the address is first corrected by the actual interconnect number from the virtual bus number table. The address relative to the MMCFG zero for access to BDF 000 is 768*4096 (since bus number 3, starts at 768$^{th}$ (256*3) device and 4096 is the size of configuration space for each device). In the case of domain one, the bus number is 2. So the address relative to VMMCFG1 is 512*4096. The actual bus number is 1 in FIG. 9, so relative to the MMCFG range the address is 256*4096, as shown in Table 8.

TABLE 8

| Domain 0 | VMMCFG0 + 768 * 4096 |
|---|---|
| Domain 1 | VMMCFG1 + 512 * 4096 |
| MMCFG range | MMCFG + 256 * 4096 |

During translation of the request from the VMMCFG range to a configuration packet, the Vnumber table is referenced based on the mapping between the virtual actual bus numbers for proper translation is performed. Procedural methods for implementing one or more of the above embodiments are now described.

Figure 10:
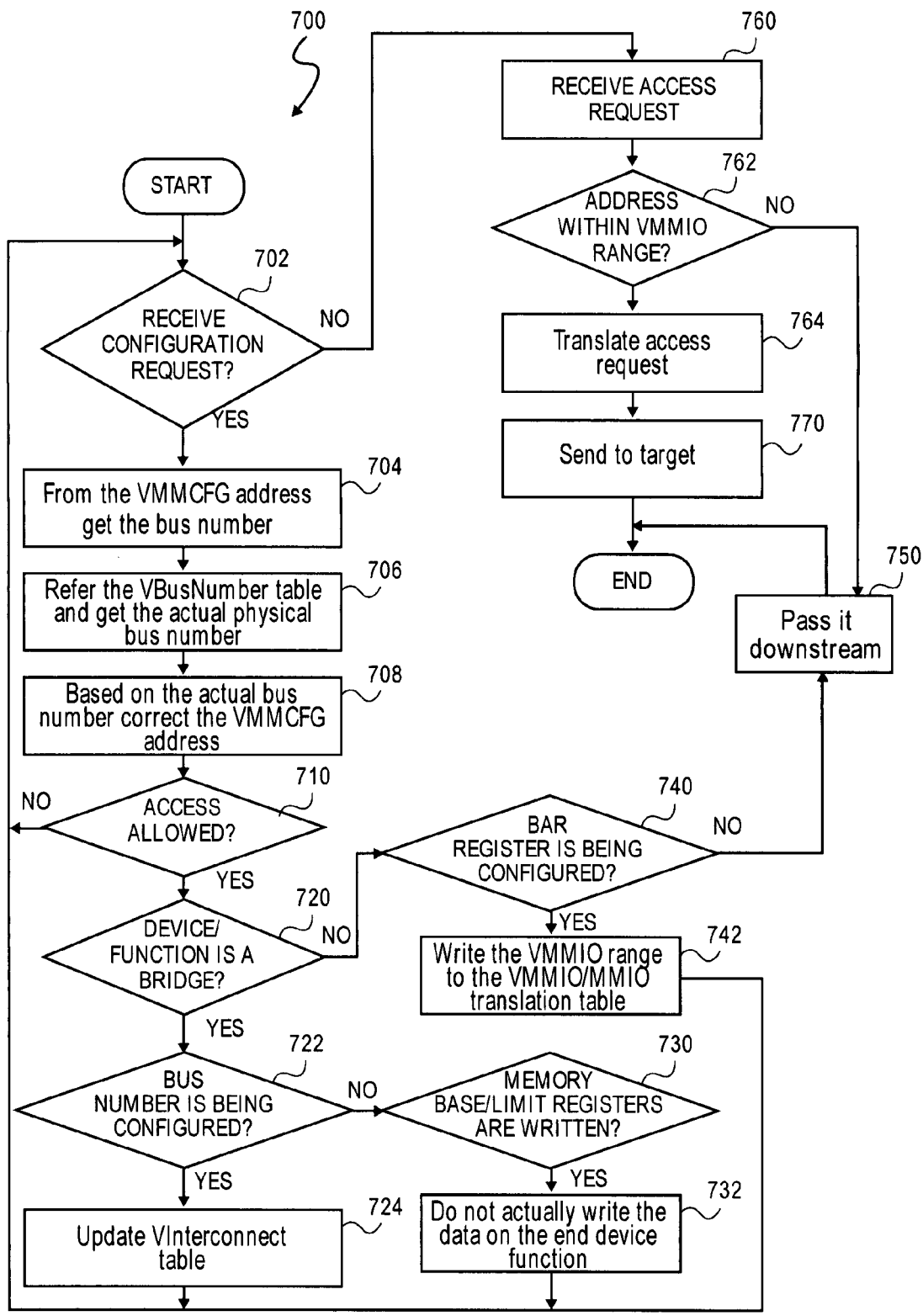
FIG. 10 is a flow chart illustrating a method for enabling the sharing of an I/O subsystem between multiple execution domains according to one embodiment.

FIG. 10 is a flow chart illustrating a method 700 for sharing devices between multiple execution domains of a single hardware platform according to one embodiment. At process block 702, it is determined whether a configuration request is received. Once such configuration request is received, it is determined whether the configuration request is within a virtual memory mapped configuration (MMCFG) address range. Once a configuration request is received having an address within a MMCFG address range, at process block 704 an interconnect (bus) number is determined from the MMCFG address. At process block 706, a Vnumber table may be referred to, to identify the actual bus number. Based on the actual bus number, at process block 708, the VMMCFG address is corrected according to the actual bus number.

As shown in process blocks 710 and 720, bitmask tables 596, as shown in FIG. 8, may be referred to, to determine, at process block 710, whether the configuration request is authorized. Additionally, at process block 720 if the configuration request is authorized, it is determined whether a target device of a configuration request is a bridge. When the target device is a bridge, a process block 722, it is determined whether a bus number is being configured. When a bus number is being configured a virtual number table, such as shown in FIG. 8 is updated as process block 724.

At process block 730, a source domain may attempt to program the memory base/memory registers that are written to a bridge. In one embodiment, unless the source domain is a VMM or embedded partition, at process block 732, a configuration write request is not written to the end device/function. At process block 740, if a non-bridge device is being configured, it is determined whether a BAR register is being configured. When a BAR register is being configured, the VMMIO range decoded from the configuration request is written to VMMIO translation table, for example, as shown in FIG. 8. Otherwise at process block 750 a configuration request may be passed downstream.

At process block 760 an access request is received from a source domain. At process block 762 it is determined whether an address request is within a VMMIO range. In one embodiment this determination is made according to a domain ID of the source domain and the VMMIO translation table corresponding to the domain ID. At process block 764 the access request is translated according to an actual MMIO address. Subsequently at process block 770 the access request is sent to a target device.

In one embodiment the various translation tables may be obviated according to an embodiment where the DML or VMM configures the device BAR registers and bridge registers. According to such an embodiment a DML or VMM is responsible for sending the notice of the serial registers data structures and bitmask required for partitioning the system. In this scheme all domains other than, for example, an embedded partition, uses the configuration provided by the partition manager and the embedded partition BIOS. Any right to the configuration address space that is not from the DML or VMM is ignored.

In one embodiment, the chipset or IOH uses configuration lock. Accordingly, in one embodiment a configuration lock that is provided such that a configuration cycles are generated only if the chipset is unlocked. The DML or VMM unlocks the configuration address space, performs the configuration and locks the configuration space.

Figure 11:
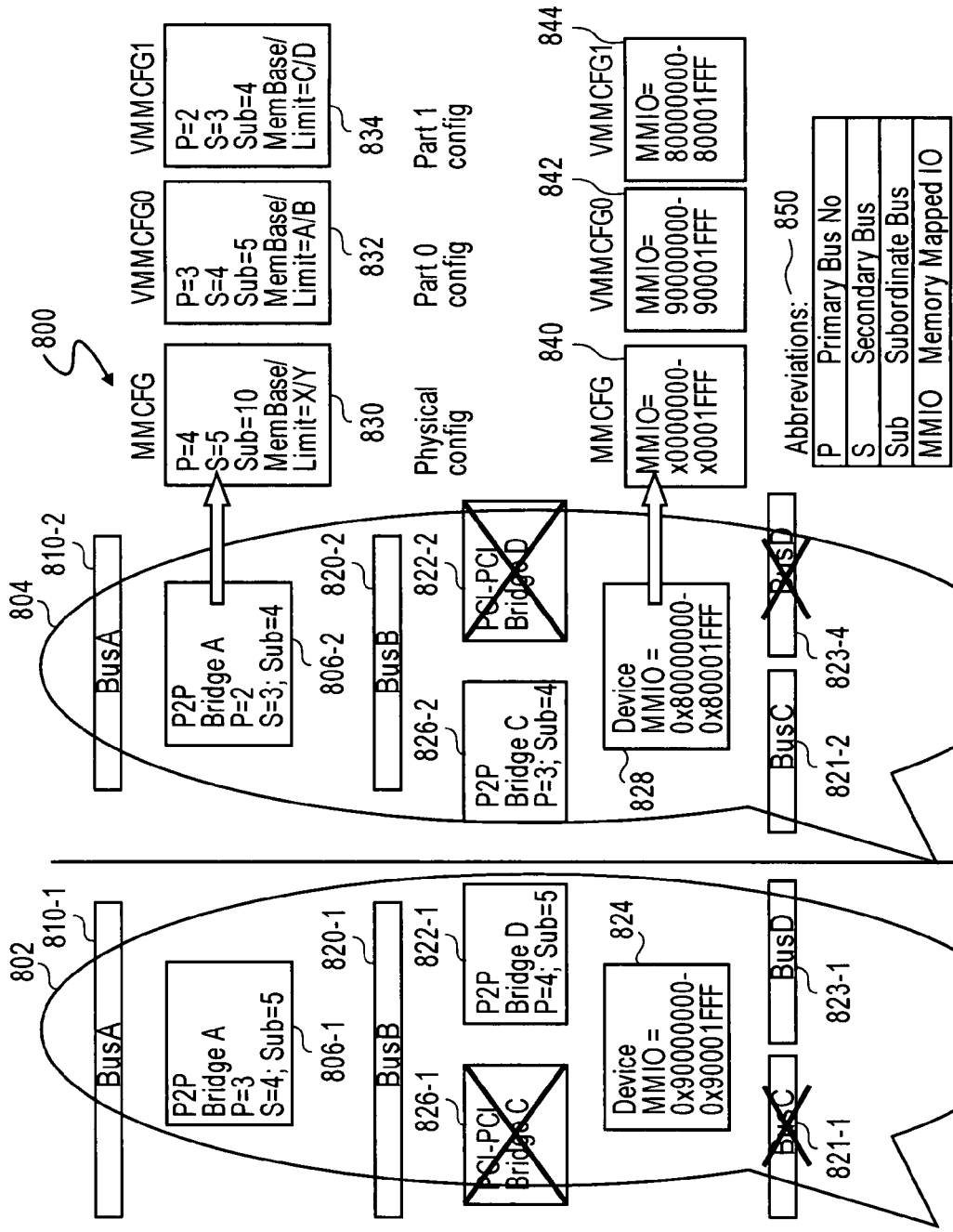
FIG. 11 is a block diagram illustrating replication of configuration registers to enable the sharing of an I/O subsystem between peripheral end-point devices, according to one embodiment.

FIG. 11 is a block diagram of an interconnect hierarchy 800 for sharing devices of an I/O subsystem between multiple execution domains according to one embodiment. As shown in FIG. 11, per domain virtual configuration registers 832-834 and 840-844 are added in each interconnect bridge and device. The virtual configuration registers, are in addition to the existing physical configuration address space. In the embodiment illustrated, based on the originating domain (802/804), the device should use the appropriate configuration registers. In one embodiment, each interconnect device is provided additional virtual configuration address ranges for each domain.

As shown in FIG. 11, bridge A 806 (806-1/806-2) has two configuration address spaces 832 and 834 for each of the domain and one physical configuration space 830 for the actual configuration. In the embodiment illustrated, each device stores the actual configuration performed by the DML or VMM as well as the virtual configurations for each of the domains 802 and 804. Representatively, for domain zero 802, bridges are configured with primary bus number 3 and secondary bus number 4 as subordinate bus number 5. Similarly, domain one 804 has same bridge A 806-2 is configured with primary 2, secondary 3 subordinate 4 (see table 850). Each device has separate configuration ranges for each of the domains and also an original configuration 830/840 for the MMCFG range. Accordingly, based on the source domain of an access the bridges/devices use the appropriate configuration. A source of the access (according to domain ID) is coded in a request to identify using for example the PCIe message. As a result, devices responded to different MMIO requests based on their domain number.

Figure 12:
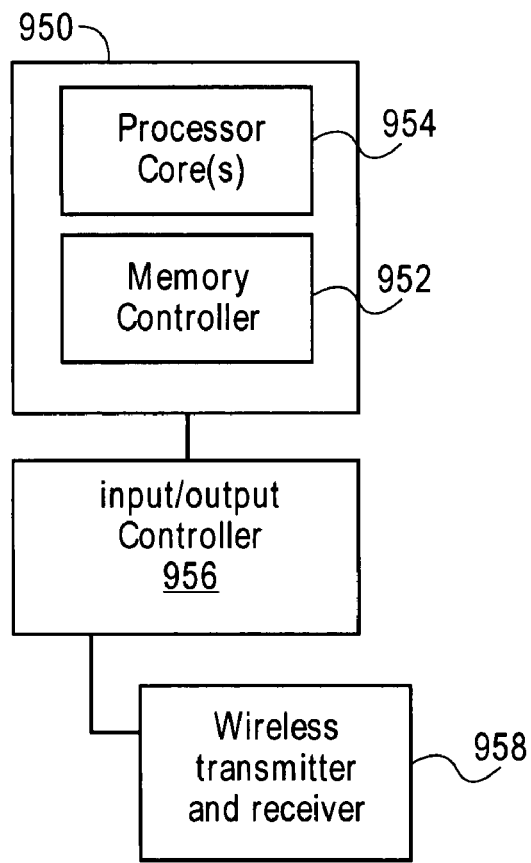
FIG. 12 is a block diagram illustrating a computer system according to any of the above described embodiments including a multi-core processor having an embedded memory controller according to one embodiment.
Figure 13:
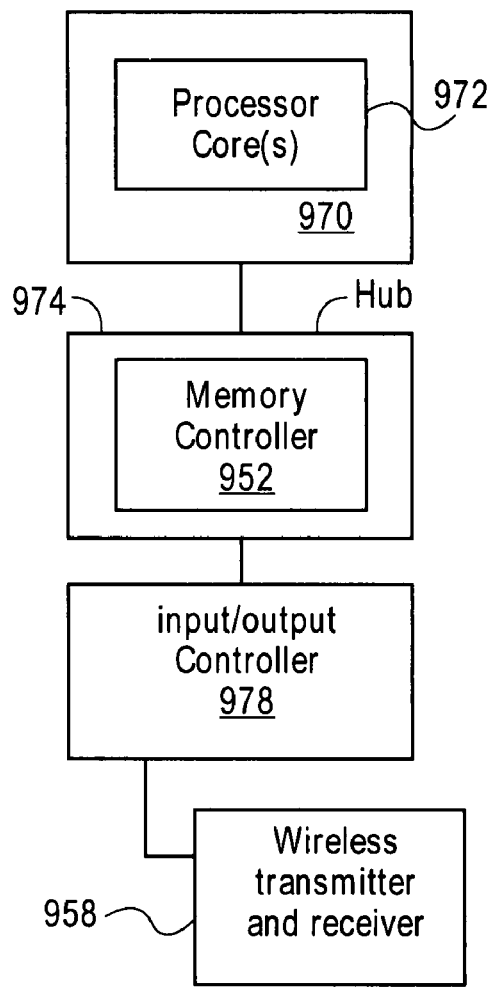
FIG. 13 is a block diagram illustrating a computer system according to any of the above described embodiments including a hub chip having a memory controller according to one embodiment.

In FIG. 12, a memory controller 952 (which represents any of previously mentioned memory controllers) is included in a chip 950, which also includes one or more processor cores 954. An input/output controller chip 956 is coupled to chip 950 and is also coupled to wireless transmitter and receiver circuitry 958. In FIG. 13, memory controller 952 is included in a chip 974, which may be a hub chip. Chip 974 is coupled between a chip 970 (which includes one or more processor cores 972) and an input/output controller chip 978. Input/output controller chip 978 is coupled to wireless transmitter and receiver circuitry 958.

It will be appreciated that, for other embodiments, a different system configuration may be used. For example, while the system 200 includes a single, multi-core CPU 202, for other embodiments, a multiprocessor system (where one or more processors may be similar in configuration and operation to the CPU 202 described above) may benefit from the peripheral device sharing of various embodiments. Further a different type of system or different type of computer system such as, for example, a server, a workstation, a desktop computer system, a gaming system, an embedded computer system, a blade server, etc., may be used for other embodiments.

Elements of embodiments may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed exemplary embodiments and the best mode, modifications and variations may be made to the disclosed embodiments while remaining within the scope of the embodiments of the invention as defined by the following claims.

What is claimed is:

1. An apparatus, comprising:
  a controller having a domain manager logic to intercept at least one configuration request from an execution domain of at least two execution domains of a partitioned hardware platform, the configuration request including configuration information assigned by the execution domain to enable access to one of an end-point device, an interconnect, and a bridge that is a target of the configuration request, the logic domain manager including:
    translation logic to store the configuration information, decoded from the intercepted configuration request as virtual configuration information, in conjunction with corresponding actual configuration information assigned to the target to enable translation of access requests issued by the at least two execution domains.

2. The apparatus of claim 1 when the controller comprises:
  a chipset including at least one first interconnect to couple a peripheral end-point device to the chipset; and at least one bridge to couple a second interconnect to the primary interconnect, wherein the chipset includes configuration logic to configure the at least one peripheral end-point device, the first and second interconnects and the at least one bridge.

3. The apparatus of claim 1, further comprising:

a memory to store a translation table to enable translation between virtual configuration information used by the at least two execution domains to configure and enumerate one or more of the end-point device, the interconnect, and the bridge, wherein the configuration request includes one or more of memory mapped input/output (I/O) registers settings, base limit registers settings, bus numbers, quality of service settings, power settings, and interrupt routing settings.

4. The apparatus of claim 1, wherein the controller further comprises:

configuration logic to detect a configuration write request, from an execution domain, to an address within a virtual configuration address space range, the configuration logic to read one of an actual memory mapped (MM) input/output (I/O) (MMIO) range and an actual interconnect number assigned to the target of the configuration write request and to populate one of an MMIO translation table and a Vnumber translation table, the MMIO table to map one of the actual MMIO range to a virtual MMIO range indicated by the write request, and the Vnumber translation table to map the actual interconnect number to a virtual interconnect number indicated by the write request.

5. The apparatus of claim 1, wherein the translation logic is further to detect an access request from an identified execution domain of the at least two execution domains to determine a translation table corresponding to the identified execution domain and to translate virtual address information decoded from the access request to a corresponding actual physical address information according to the translation table.

6. A system, comprising:

a multi-core processor;

a memory;

a chipset coupled between the processor and the memory, the chipset comprising:

an input/output (I/O) hub (IOH), including a controller having a domain manager logic to intercept at least one configuration request from an execution domain of at least two execution domains partitioned within the multi-core processor, the configuration request including configuration information assigned by the execution domain to enable access to one of an end-point device, an interconnect, and a bridge that is a target of the configuration request, the logic domain manager including:

translation logic to store the configuration information decoded from the intercepted configuration request as virtual configuration information in conjunction with corresponding actual configuration information assigned to the target to enable translation of access requests issued by the at least two execution domains; and a wireless transmitter and receiver circuitry coupled to the chipset.

7. The system of claim 6, wherein the IOH further comprises:

a serial interface controller coupled to at least one first interconnect to couple one or more peripheral end-point devices to the IOH; and at least one bridge to couple a second interconnect to the first interconnect, wherein the IOH includes configuration logic to configure the one or more peripheral end-point devices, the first and second interconnects, and the at least one bridge.

8. The system of claim 6, wherein the memory is further to store a translation table to enable translation between virtual configuration information used by the at least two execution domains to configure and enumerate one or more of the end-point device, the interconnect, and the bridge, and wherein the configuration request includes one or more of memory mapped input/output (I/O) registers settings, base limit registers settings, bus numbers, quality of service settings, power settings, and interrupt routing settings.

9. The system of claim 6, wherein the chipset further comprises: configuration logic to configure/enumerate each of the one of the bridge, the end-point device, and the interconnect when authorized according to a configuration lock bit.

10. The system of claim 6, wherein the at least two execution domains comprise one of virtual machines and hardware partitions and the domain manager logic comprises one of a virtual machine monitor and an embedded partition.

11. A method comprising:

configuring at least one of an end-point device, an interconnect, and a bridge of a hardware platform, the hardware platform partitioned into at least two execution domains;

intercepting a configuration request from an execution domain of the at least two execution domains, the configuration request including configuration information assigned by the execution domain to enable access to one of the end-point device, the interconnect and the bridge that is a target of the configuration request;

storing the configuration information decoded from the intercepted configuration request as virtual configuration information in conjunction with corresponding actual configuration information assigned to the target to enable translation of access requests issued by the at least two execution domains.

12. The method of claim 11, further comprising:

reading the actual configuration information corresponding to the virtual configuration information from the target of the configuration request; and storing the virtual configuration information and the actual configuration information within a translation table that maps the actual configuration information to the virtual configuration information to prohibit conflicting configuration of the end-point device, the bridge and the interconnect between the at least two execution domains.

13. The method of claim 11, wherein intercepting the configuration request further comprises:

detecting a configuration write request from the execution domain to an address within a virtual configuration address space range;

identifying a target of the write request as a configuration register of an end-point device;

reading an actual memory mapped (MM) input/output (I/O) (MMIO) address range of the end-point device; and populating an MMIO translation table to map the actual MMIO address range to a virtual MMIO address range decoded from the intercepted write request.

14. The method of claim 11, wherein intercepting the configuration request further comprises:
intercepting a configuration write request to a virtual configuration address space range;
identifying a source execution domain of the configuration write request according to the virtual configuration address space range;
identifying a target of the configuration write request as a bridge;
reading an actual bus number from a configuration register of the bridge; and
populating a bus number translation table to map a virtual bus number decoded from the configuration write request with the actual bus number.

15. The method of claim 11, further comprising:
detecting an access request from an execution domain, of the at least two execution domains, to a memory address;
intercepting the access request if the memory address of the detected access request, is within a virtual memory mapped input/output (VMMIO) address range;
translating the memory address of the access request according to a translation table, corresponding to the execution domain, to determine a physical memory address; and
issuing the access request to the physical memory address.

16. The method of claim 11, further comprising:
detecting an access request for an identified execution domain of the at least two execution domains;
identifying a translation table corresponding to identified execution domain; and
translating virtual address information decoded from the access request to a corresponding actual address information according to the translation table.

17. An article of manufacture having a machine accessible medium including associated data, wherein the data, when accessed by a machine, results in the machine performing operations comprising:
detecting a configuration write request from a source domain of at least two execution domains of a partitioned hardware platform, the configuration write request having a target address within a virtual configuration address range;
identifying a target of the configuration write request as one of a bridge and a non-bridge device;
updating an address translation table if an interconnect device function number of the configuration write request indicates a non-bridge device and a target of the configuration write request is a configuration register of the non-bridge device; and
updating a bus number translation table if the interconnect device function number of the configuration write request indicates a bridge and an interconnect number register of the bridge is the target of the configuration write request.

18. The article of manufacturer of claim 17, wherein the machine is further caused to perform operations comprising:
assigning a respective portion of a configuration address space to each respective execution domain of the hardware platform; and
storing an address range of each portion of the configuration address space assigned to the respective execution domain of the hardware platform to enable identification of an execution domain according an address of an access request issued by the respective execution domain.

19. The article of manufacture of claim 17, wherein prior to the operation of detecting the configuration write request, the machine is further caused to perform operations comprising:
identifying an interconnect number from the target address;
referring to a virtual bus number translation table to identify an actual, physical interconnect number corresponding to identified interconnect number;
correcting the target address according to the actual bus number; and
rejecting the configuration write request if the source domain is prohibited from configuration of the bridge/non-bridge device indicated by the interconnect device/function number of the configuration write request.

20. The article of manufacture of claim 17, wherein prior to the operation of detecting the configuration write request, the machine is further caused to perform operations comprising:
assigning a subset of peripheral end-point devices, interconnects and bridges of a hardware platform among one or more execution domains of the hardware platform;
populating a configuration address space mask to indicate, for each execution domain, whether the execution domain has access to a respective bridge, interconnect, and peripheral end-point device of the hardware platform; and
populating a bridge/device bitmask to indicate if a hardware platform node is one of a bridge and a non-bridge device.

* * * * *